US008147935B2

(12) United States Patent
Ferreiro et al.

(10) Patent No.: US 8,147,935 B2
(45) Date of Patent: Apr. 3, 2012

(54) MULTILAYER STRUCTURE COMPRISING AT LEAST ONE STABILIZED LAYER

(75) Inventors: Vincent Ferreiro, Saint-Sebastien de Morsent (FR); Thibaut Montanari, Menneval (FR); Fabrice Montezin, Saint Aubin de Scellon (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/395,826

(22) Filed: Mar. 2, 2009

(65) Prior Publication Data

US 2009/0269532 A1 Oct. 29, 2009

(30) Foreign Application Priority Data

Mar. 3, 2008 (FR) ...................................... 08 51380

(51) Int. Cl.
*B29C 41/00* (2006.01)
(52) U.S. Cl. ...................... 428/35.7; 428/35.8; 428/35.9
(58) Field of Classification Search ................ 428/474.7, 428/35.7, 35.8, 35.9
See application file for complete search history.

(56) References Cited

U.S. PATENT DOCUMENTS

| 5,316,713 | A | * | 5/1994 | Koster | 264/209.1 |
| 6,555,243 | B2 | | 4/2003 | Flepp et al. | |
| 6,656,553 | B2 | * | 12/2003 | Nishi et al. | 428/36.91 |
| 7,063,873 | B2 | | 6/2006 | Bellet et al. | |
| 2005/0025920 | A1 | * | 2/2005 | Stolarz et al. | 428/35.7 |
| 2007/0113467 | A1 | | 5/2007 | Abou-Nemeh | |
| 2007/0196605 | A1 | * | 8/2007 | Ong | 428/35.7 |

FOREIGN PATENT DOCUMENTS

| DE | 19847627 | | 4/2000 |
| DE | 19847627 | A1 | 4/2000 |
| DE | 19847627 | W | 4/2000 |
| EP | 1 162 061 | A1 | 12/2001 |
| EP | 1162061 | A1 | 12/2001 |
| EP | 1 243 831 | | 9/2002 |
| EP | 1243831 | A1 | 9/2002 |
| EP | 1531174 | A2 | 5/2005 |
| EP | 1741549 | A1 | 10/2007 |
| FR | 0851380 | R | 11/2008 |
| WO | 0059706 | A2 | 10/2000 |
| WO | WO2005/018891 | * | 3/2005 |
| WO | WO 2005/018891 | | 3/2005 |
| WO | 2007079765 | A1 | 7/2007 |
| WO | 2007082924 | A1 | 7/2007 |
| WO | WO 2007/079765 | | 7/2007 |
| WO | WO2007/082924 | * | 7/2007 |

OTHER PUBLICATIONS

Abstract of DE 19847627; "Copper salt-based stabilizer for polyamides for electrical and electronics industries comprises complex with phosphine and/or mercaptobenzimidazole compound and at least one halogenated organic compound"; Apr. 20, 2000.
Abstract of WO 2007/079765; "Vegetable oil diesel fuel", Jul. 19, 2007.
Abstract of EP 1162061 (A1), "Thermoplastic laminates", Dec. 12, 2001.
Abstract of EP 1243831 (A1), "Multilayer plastic tube for conveying fluids", Sep. 25, 2002.
French Search Report dated Nov. 5, 2008.

* cited by examiner

*Primary Examiner* — Leszek Kiliman
(74) *Attorney, Agent, or Firm* — Millen, White, Zelano & Branigan, P.C.

(57) ABSTRACT

The invention relates to a multilayer structure comprising at least two layers:
- a layer, referred to as the inner layer, intended to be in contact with a fluid, comprising a composition comprising at least one polymer and not comprising any copper, and
- a layer, referred to as the outer layer, intended to be in contact with the air, comprising a composition containing at least one polymer and at least one copper-based stabilizer.

The invention also relates to a pipe comprising such a multilayer structure, and also to its use for transporting or storing fluids.

17 Claims, No Drawings

MULTILAYER STRUCTURE COMPRISING AT LEAST ONE STABILIZED LAYER

The invention relates to a multilayer structure comprising at least two layers, one comprising at least one polymer and not comprising any copper, and the other comprising at least one polymer and at least one copper-based stabilizer.

The invention also relates to a pipe comprising such a multilayer structure, and also to its use for transporting or storing fluids.

In the field of motor vehicles, and of transport in general, the composition of combustibles is in constant evolution, especially for technological reasons, which is reflected by the gradual arrival of biocombustibles on the market. These combustibles are more corrosive. Consequently, it is essential to improve the quality of the thermoplastic components in contact with these novel combustibles.

It is important to increase the resistance to thermal ageing (in other words the resistance to oxidation in hot air) of these components, since the temperature of the air surrounding the engine is elevated for reasons of yield and noise. This is especially the case for common-rail direct-injection diesel engines. In the case of polyamide-based thermoplastic pipes that convey combustible, the outer face is in contact with hot air and the inner face in contact with the novel biocombustibles, in particular biodiesel.

These novel biocombustibles and biodiesels are much more corrosive than traditional fossil combustibles. The higher external temperature will tend to increase the temperature of the combustible, making it even more corrosive with respect to polyamide thermoplastic. The resistance to ageing with respect to combustibles should thus be improved. Biocombustibles, and in particular biodiesel, become more corrosive especially due to the increasing presence of a proportion of polar derivatives of non-fossil origin. These biocombustibles, under the effect of higher temperatures, are particularly sensitive to oxidation and to degradation. This typically results in the formation of peroxides, which decompose into free radicals, which themselves attack the polymer material in the motor vehicle components in contact with the said combustible (for example the polyamide pipes for feeding or evacuating combustible).

More particularly, biodiesels comprising unsaturated fatty acid esters are very sensitive to this oxidation. Biodiesel may typically contain between 5% and 30% of fatty esters (30% for the biodiesel known as B30). Constructors' qualification tests are occasionally performed in B100, i.e. biodiesel constituted of 100% fatty ester. These fatty esters are derived from oils, in particular from rapeseed oil (known as RME), soybean oil (known as SME) or palm oil.

These concerns are especially directed towards, in a non-limiting manner, the structures in the form of pipes used for circulating combustibles or other corrosive liquids such as coolant liquids, components located in the vicinity of the engine, or structures such as tanks.

To improve the resistance to thermal ageing of such structures, they are generally made from compositions comprising a polymer, conventionally a polyamide, various additives such as a plasticizer, an impact modifier and a stabilizer.

This stabilizer may be an organic stabilizer or, more generally, a combination of organic stabilizers, such as a primary antioxidant of phenol type (for example of the type such as Irganox 245, 1098 or 1010 from the company Ciba), a secondary antioxidant of phosphite type, and even, optionally, other stabilizers such as a HALS, which means Hindered-Amine Light Stabilizer (for example Tinuvin 770 from the company Ciba), a UV stabilizer (for example Tinuvin 312 from the company Ciba), or a phenolic or phosphorus-based stabilizer. It is also possible to use antioxidants of amine type such as Naugard 445 from the company Crompton, or polyfunctional stabilizers such as Nylostab S-EED from the company Clariant.

This stabilizer may also be a mineral stabilizer, such as a copper-based stabilizer. Examples of such mineral stabilizers that may be mentioned include copper halides and acetates. Incidentally, other metals such as silver may optionally be considered, but these are known to be less efficient. These copper-based compounds are typically combined with alkali metal halides, in particular potassium halides.

These mineral stabilizers are more particularly used when the structures must have improved long-term heat resistance in hot air, especially for temperatures of greater than or equal to 100-120° C., since they tend to prevent the cleavage of polymer chains.

With regard to the increase in temperatures under the engine hood, it becomes necessary to use such mineral stabilizers to enable prolonged resistance to degradation (service life of the vehicle) of the component to attack by hot air.

Unfortunately, components constituted of these structures stabilized with mineral stabilizers have drawbacks in terms of resistance to degradation, when the said components come into contact with biocombustible, and most particularly biodiesel, such as biodiesel based on esters derived from soybean oil (SME or Soybean Methyl Ester), these drawbacks being aggravated when the proportion of "bio" species, i.e. the species of non-fossil origin (ester) is high within this biocombustible, and when the temperature of the said biocombustible is high, generally greater than or equal to 120° C. This is due to the fact that these biocombustibles undergo more less substantial degradation, leading to a production of peroxides in a non-negligible content, noted PON>50 or even 200 or more, the PON being the peroxide number. These peroxides readily decompose into free radicals under the effect of copper and, to a lesser extent, under the effect of other metals. These radicals can thus attack the polymer and lead to its chemical degradation and to the loss of its mechanical strength properties, and thus to disintegration of the structure.

Thus, it would be advantageous to find a structure of two-fold quality, namely a structure whose resistance to thermal ageing (for example on contact with hot air) is very good, while at the same time having very good resistance to ageing on contact with corrosive fluids (or fluids that are liable to become corrosive over time), such as biocombustibles.

The present invention is thus directed towards solving this problem and overcoming the drawbacks raised above.

The invention relates to a multilayer structure comprising at least two layers:
 a layer, referred to as the inner layer, intended to be in contact with a fluid, constituted of a composition comprising at least one polymer and not comprising any copper, and
 a layer, referred to as the outer layer, intended to be in contact with air, constituted of a composition comprising at least one polymer and at least one copper-based stabilizer.

The combination of these two layers in a structure makes it possible to improve each of the desired effects, namely resistance to thermal ageing and resistance to peroxidized biocombustible.

Advantageously, the inner and outer layers show good adhesion, making it possible to avoid the phenomenon of peeling between the layers, especially over time. To avoid this phenomenon, either the compositions of the inner and outer layers are carefully chosen, or a layer of an appropriate binder is intercalated.

Components of the Structure

The term "copper-based stabilizer" means a compound comprising at least one copper atom, especially in ionic or ionizable form, for example in the form of a complex.

Preferably, the composition of the inner layer also does not comprise any other transition metal.

Even more preferably, the composition of the inner layer, which does not comprise any copper-based stabilizer and, where appropriate, any other transition metal, may, on the other hand, comprise at least one organic stabilizer.

The term "organic stabilizer" means a compound not comprising any metal atoms, and being constituted essentially of carbon and hydrogen atoms, and possibly of oxygen, nitrogen, sulfur and phosphorus atoms. This organic stabilizer makes it possible, inter alia, to improve the heat stability of the polymer.

The polymers used in the compositions of the inner and outer layers may be identical or different. Preferably, the polymers used are thermoplastic polymers.

The invention more particularly relates to polyamide-based multilayer structures, i.e. structures in which the polymers used in the composition of at least one of the layers, the inner and outer layers, is a polyamide or a mixture of polyamides.

Advantageously, the compositions constituting the layers of the structure predominantly comprise a polyamide or a mixture of polyamides.

Preferentially, the invention relates to a multilayer structure comprising:
- an inner layer, constituted of a composition predominantly comprising at least one polyamide and not comprising any copper, preferentially with at least one organic stabilizer, and
- an outer layer, constituted of a composition predominantly comprising at least one polyamide and at least one copper-based stabilizer.

It is possible to consider multilayer structures comprising an outer layer based on a polymer other than polyamides and an inner layer (with copper-free stabilization) based on a polymer other than polyamide.

By way of illustration of the foregoing, it is especially possible to envisage a two-layer structure, for example a pipe, constituted of:
- a layer comprising PA11 and a copper-based stabilizer, and
- a layer comprising polypropylene and, where appropriate, an organic stabilizer.

A two-layer structure formed from two layers of PVDF may also be envisaged, the composition of one of the two layers comprising a copper-based stabilizer, the composition of the other layer not comprising any copper.

The inner and outer layers are preferably predominantly constituted of a polyamide or a mixture of polyamides.

The predominant polymer may thus represent at least 50% by weight relative to the total weight of the composition constituting at least one of the inner and outer layers.

Let us define what we mean by the term "polyamide".

According to the present patent application, the term "polyamide", also noted PA, is directed towards:
  homopolymers,
  copolymers or copolyamides, based on different amide units, for instance copolyamide 6/12 with amide units derived from lactam-6 and from lactam-12,
  polyamide alloys, provided that the polyamide is the major constituent.

There also exists a category of copolyamides in the broad sense, which, although not preferred, falls within the context of the invention. These are copolyamides comprising not only amide units (which will be predominant, hence the fact that they should be considered as copolyamides in the broad sense), but also units of non-amide nature. The best-known examples are polyether-block-amides, noted PEBA, and variants thereof copolyamide-ester-ether, copolyamide-ether and copolyamide-ester. Among these, mention will be made of PEBA-12 in which the polyamide units are the same as those of PA12, and PEBA-6.12 in which the polyamides units are the same as those of PA6.12.

The homopolyamides, copolyamides and alloys are also distinguished by their number of carbon atoms per nitrogen atom.

A high-carbon polyamide is a polyamide with a high content of carbon atoms (C) relative to the nitrogen atom (N). There are as many nitrogen atoms as there are amide groups (—CO—NH—) in a polyamide. High-carbon polyamides are polyamides with at least about 9 carbon atoms per nitrogen atom, for instance polyamide-9, polyamide-12, polyamide-11, polyamide-10.10 (PA10.10), copolyamides 12/10.T, copolyamide 11/10.T, polyamide-12.T and polyamide-6.12 (PA6.12). T represents terephthalic acid.

A high-carbon polyamide is very flexible and very tough (in particular with respect to cold shocks, to ageing in hot air and to resistance to zinc chloride). The major compositions of polyamides of this type will advantageously be used as outer layer, and occasionally also as inner layer of the multilayer structures.

Polyamide-11 and polyamide-12 are two polyamides that are very similar in properties in the solid and melt state. They are in particular very flexible and thus particularly suitable for serving as flexible and tough polyamide. In many cases, one or the other may be used. It will be noted, however, that polyamide-11 has properties superior to those of polyamide-12, in particular in terms of resistance to cold shocks and mechanical strength at elevated temperature (for example hot burst strength). It will therefore be preferred for particularly extreme situations. Polyamide-11 moreover has the advantage of being a biopolymer, since it is derived from a plant raw material, and is thus renewable.

A low-carbon polyamide is a polyamide with a low content of carbon atoms (C) relative to the nitrogen atom (N). These are polyamides with less than about 9 carbon atoms per nitrogen atom, for instance polyamide-6, polyamide-6.6, polyamide-4.6, copolyamide-6.T/6.6, copolyamide 6.I/6.6, copolyamide 6.T/6.I/6.6 and polyamide 9.T. I represents the isophthalic diacid.

In contrast, a composition based on low-carbon polyamide will be more fragile, but will have barrier properties to fuels, i.e. it will be very sparingly permeable to combustibles. It will therefore advantageously be found as a median layer, or even as an inner layer of the multilayer structures.

The nomenclature used to define polyamides is described in the standard ISO 1874-1:1992 "Plastics—polyamide (PA) materials for moulding and extrusion—Part 1: Designation", especially on page 3 (Tables 1 and 2) and is well known to those skilled in the art.

In the case of a homopolyamide of the type PA-X.Y, with X denoting a unit obtained from a diamine and Y denoting a unit obtained from a diacid, the number of carbon atoms per nitrogen atom is the mean of the number of carbon atoms present in the unit derived from the diamine X and in the unit derived from the diacid Y. Thus, PA6.12 is a PA containing 9 carbon atoms per nitrogen atom, in other words a C9 PA. PA6.13 is C9.5. PA-12.T is C10, the T, i.e. terephthalic acid, being C8.

In the case of copolyamides, the mean number of carbon atoms per nitrogen atom is calculated according to the same principle. The calculation is performed on a molar pro rata of the various amide units. Thus, coPA-6.T/6.6 60/40 mol % is C6.6: $60\% \times (6+8)/2 + 40\% \times (6+6)/2 = 6.6$. In case of a copolyamide containing units of non-amide type, the calculation is performed solely on the portion of amide units. Thus, for example, PEBA-12, which is a block copolymer of amide units 12 and of ether units, the mean number of carbon atoms per nitrogen atom will be 12, as for PA12; for PEBA-6.12, it will be 9, as for PA6.12.

In the case of mixtures or alloys, the calculation of the mean number of carbon atoms per nitrogen atom is performed solely on the fraction constituted of polyamides. For example, a composition with 67 parts by mass of PA12 (12 carbon atoms per nitrogen atom), 33 parts by mass of PA6 (6 carbon atoms per nitrogen atom) will be a polyamide composition containing 10 carbon atoms per nitrogen atom, in other words C10. The calculation is as follows: $12 \times 67/(67+33) + 6 \times 33/(67+33)$. In the case of a similar composition but also comprising 40 parts of EPR impact modifier, which is not a polyamide, the mean number of carbon atoms per nitrogen atom will also be 10.

Preferably, the predominant polymer, which generally corresponds to the polymer forming the continuous phase, also known as the matrix, of the composition of at least one of the inner and outer layers, is a high-carbon polyamide or mixture of polyamides, i.e. a polyamide in which the mean number of carbon atoms per nitrogen atom is at least 7.5, preferably at least 9 and even more preferably at least 10.

The term "mixture of polyamides" means a mixture of at least two of the polymers corresponding to the above definition of "polyamides".

More particularly, the polyamides are chosen from PA11, PA12, PA10.10, PA10.12, PA6.18, PA10.T, PA12/10.T and PA11/10.T and mixtures thereof.

The polyamide or the mixture of polyamides is chosen so as to withstand hot biocombustibles, in particular alcohol-based biofuels.

The polyamide or the mixture of polyamides is preferably chosen sufficiently semicrystalline, i.e. with a heat of fusion of greater than or equal to 25 J/g (measured by DSC: Differential Scanning Calorimetry) relative to the mass fraction of polyamide(s) in the composition.

The heats of fusion of the polyamides present in the composition according to the invention are measured in accordance with the standard ISO 11357. Thus, the polyamide is subjected to a first heating at 20° C./minute up to a temperature of 280° C., and then to cooling at 20° C./minute down to a temperature of 20° C., and then to a second heating at 20° C. up to a temperature of 280° C., the heat of fusion being measured during this second heating.

Preferentially, the polyamide or the mixture of polyamides should be able to be used at high working temperatures. Preferably, the polyamides have a melting point of greater than or equal to 170° C.

The copper-based stabilizer present in the outer layer may be chosen from cuprous chloride, cupric chloride, cuprous bromide, cupric bromide, cuprous iodide, cupric iodide, cuprous acetate and cupric acetate. Mention may be made of halides and acetates of other metals such as silver in combination with the copper-based stabilizer. These copper-based compounds are typically combined with alkali metal halides. A well-known example is a mixture of CuI and KI, in which the CuI/KI ratio is typically between 1:5 and 1:15. An example of such a stabilizer is Polyadd P201 from the company Ciba.

Further details regarding copper-based stabilizers will be found in U.S. Pat. No. 2,705,227. More recently, copper-based stabilizers such as complexed coppers, for instance Bruggolen H3336, H3337 and H3373 from the company Brueggemann, have appeared.

Advantageously, the copper-based stabilizer is chosen from copper halides, copper acetate, copper halides or copper acetate as a mixture with at least one alkali metal halide, and mixtures thereof, preferably mixtures of copper iodide and potassium iodide (CuI/KI).

Preferably, the copper-based stabilizer is present in the composition constituting the outer layer of the structure in a content of between 0.05% and 1.5% by weight relative to the total weight of the said composition.

It is pointed out that the term "between" used in the preceding paragraphs, and also in the rest of the present description, should be understood as including each of the mentioned limits.

The inner layer should not contain any copper-based stabilizer.

It may contain no organic stabilizer, especially when the polymer constituting the inner layer is sufficiently resistant or intrinsically very stable. If the polymer of the inner layer has stability problems, such as those outlined above, an organic stabilizer is then necessary.

The organic stabilizer present in the inner layer may be chosen, without this list being limiting, from:

- phenolic antioxidants, for example Irganox 245, Irganox 1010 and Irganox 1098 the company Ciba, Irganox MD1024 from the company Ciba, and Lowinox 44B25 from the company Great Lakes,
- phosphorus-based stabilizers, for instance phosphites, for example Irgafos 168 from the company Ciba,
- a UV absorber, such as Tinuvin 312 from the company Ciba,
- a HALS, as mentioned previously,
- a stabilizer of amine type, such as Naugard 445 from the company Crompton, or of hindered amine type such as Tinuvin 770 from the company Ciba,
- a polyfunctional stabilizer such as Nylostab S-EED from the company Clariant.

A mixture of two or more of these organic stabilizers may obviously be envisaged.

Preferably, the organic stabilizer is present in the polymer in the composition constituting the inner layer of the structure in a content of between 0.3% and 3% by weight relative to the total weight of the said composition.

The composition of at least one of the layers, the inner and outer layers, may comprise up to 30% by weight, relative to the total weight of the said composition, of an impact modifier.

The impact modifier is advantageously constituted by a polymer with a modulus of flexure of less than 100 MPa, measured according to the standard ISO 178, and with a Tg of less than 0° C.

Preferably, the impact modifier is constituted of one or more polyolefins, some or all of these polyolefins bearing a function chosen from carboxylic acid, carboxylic anhydride and epoxide functions. Most particularly, the polyolefin may be chosen from a copolymer of ethylene and propylene of elastomeric nature (EPR), an ethylene-propylene-diene copolymer of elastomeric nature (EPDM) and an ethylene/alkyl(meth)acrylate copolymer.

The composition of at least one of the layers, the inner and outer layers, and preferably the composition of the inner layer, comprises up to 50% by weight, relative to the total weight of the said composition, of a semicrystalline polyolefin or mixture of polyolefins, with a modulus of flexure, measured according to the standard ISO 178, of greater than 300 MPa and advantageously greater than 800 MPa.

Some or all of the rigid semicrystalline polyolefin, or of the mixture of rigid polyolefins, may bear a function chosen from carboxylic acid, carboxylic anhydride and epoxide functions. Preferably, the semicrystalline polyolefin, or mixture of polyolefins, is chosen from high-density polyethylenes and homopolymeric or sparingly copolymerized polypropylenes.

The compositions of the inner and outer layers may also comprise common additives such as plasticizers, dyes, pigments, optical brighteners, nucleating agents, antistatic fillers such as carbon black or carbon nanotubes.

Multilayer structures comprising an inner layer of antistatic nature may have an additional advantage, in particular with regard to the legislation in certain countries such as the United States.

Categories of Structures

In one advantageous version of the invention, the structure may comprise at least one layer with barrier properties, i.e. which is very sparingly permeable to motor vehicle fluids, and especially to fuels.

According to a first embodiment, the barrier layer may thus be constituted of a composition predominantly comprising at least one polymer chosen from a fluoro polymer and an ethylene-vinyl alcohol copolymer (EVOH).

Advantageously, the fluoro polymer is chosen from polyvinylidene fluoride (PVDF), ethylene-tetrafluoroethylene copolymer (ETFE), and the copolymer of ethylene, tetrafluoroethylene and hexafluoropropylene (EFEP-C). The fluoro polymer may be functionalized. An anhydride-functionalized PVDF may especially be used.

Preferably, the barrier layer is constituted of a composition predominantly comprising an EVOH copolymer.

According to a second embodiment, the motor vehicle fluid-barrier layer may be constituted of a composition predominantly comprising at least one polyamide chosen from a low-carbon crystalline polyamide, preferably bearing aromatic units, and an alloy of at least one low-carbon polyamide, preferably an bearing aromatic units, and a polyolefin.

In a more particularly preferred variant, the barrier layer is constituted of a composition predominantly comprising at least one low-carbon polyamide, in which the mean number of carbon atoms per nitrogen atom is less than 9, preferably less than 8.5 and preferably less than 7.5, and optionally a polyamide comprising aromatic units.

Low-carbon polyamides, which are optionally highly crystalline, optionally based on aromatic units, are materials that may have the most advantageous barrier properties. The reason for this is that polyamides act all the more as barriers the lower their carbon content and the higher their content of aromatic units.

If the fluid to be transported or stored is a fuel constituted of large molecules, such as diesels and biodiesels (mixture of standard diesel and of fatty esters), the materials based on high-carbon polyamides are fully sufficient in terms of barrier properties, i.e. they are very sparingly permeable to fluids.

Consequently, for this case, the two-layer structure according to the invention may be constituted solely of the two layers, the inner and outer layers.

The structure according to the invention may thus be constituted of:

a layer, known as the inner layer, constituted of a composition comprising a high-carbon polyamide and an organic stabilizer, and a layer, known as the outer layer, comprising a composition comprising a high-carbon polyamide and a copper-based stabilizer.

The high-carbon polyamide may be, for example, a PA12.

The presence of a barrier material is necessary if the fuels or fluids (which are intended to be transported or stored in the multilayer structure) comprise small molecules such as fuels and biofuels (mixtures of standard fuel and of alcohol).

In one variant of the invention, the motor vehicle fluid-barrier layer may be formed by the layer known as the inner layer.

According to this variant, the composition of the inner layer is formed by a fluoro polymer, as defined above, for instance tetrafluoroethylene and hexafluoropropylene EFEP-C (Structure 4, Appendix 1) or polyvinylidene fluoride PVDF: it may be unnecessary to add an organic stabilizer to this composition to reinforce its resistance to ageing, since some of these polymers are themselves sufficiently resistant.

In another advantageous version of the invention, the structure may also comprise at least one layer of binder, arranged between the inner and outer layers.

In particular, when it is necessary to make a layer based on high-carbon polyamide adhere with a layer based on low-carbon polyamide or based on EVOH, then, advantageously, the layer of binder is constituted of a composition chosen from a mixture of copolyamides 6/12, one rich in units 6, the other rich in units 12, a functionalized polyolefin and a mixture of several polyamides with a functionalized polyolefin.

The binder may thus comprise one or more polyamides, copolyamides, grafted polypropylene, alone, as a mixture or as a mixture with additives.

Reference may be made especially to the examples of binder compositions given in the examples.

According to this last embodiment, the structures may be constituted of three layers, with, as outer layer: a tough layer of high-carbon polyamide comprising the copper-based stabilizer, an intermediate binder layer, and, as layer: a polyamide barrier layer, in which the mean number of carbon atoms per nitrogen atom is less than 9, which may comprise an organic stabilizer. According to one preferred embodiment, the barrier polyamide bears aromatic units.

If the barrier polyamide is combined with a highly crystalline polyolefin, the barrier effect is further reinforced, in particular in the case where the biocombustible, especially biofuel, contains a high content of ethanol. Specifically, such a composition based on a polar polymer such as an aliphatic low-carbon homopolyamide, and a highly crystalline but apolar polymer, such as a high-density polyethylene (HDPE) or a homopolypropylene, is particularly suitable for affording a barrier with respect to a mixture of apolar hydrocarbons and of polar alcohol, such as biofuel. The polyamides bearing aromatic units, and preferably being low in carbon, may also obviously be considered as barrier polyamide.

When a layer of EVOH is used as barrier layer, one or more binder layers may also be necessary.

If a layer of EVOH is intercalated between the inner layer of barrier polyamide and the intermediate binder layer, structures that are very sparingly permeable to fluids are obtained. The biofuel-barrier effect (with respect to fuels comprising alcohol, especially ethanol) will be all the more pronounced the richer the content of vinyl alcohol units and the poorer the content of ethylene units of the EVOH. For example, an EVOH containing 24% ethylene will be more efficient than an EVOH containing 44% ethylene. Moreover, an EVOH rich in vinyl alcohol units and poor in ethylene units will be proportionately more resistant in biofuels the higher the temperature of these biofuels.

Thus, structures containing four layers and structures containing five layers that are symmetrical with a high-carbon polyamide as outer layer may be distinguished. The latter structures have greater impact strength, resistance to $ZnCl_2$ and resistance to peroxides.

According to another embodiment, the structure may comprise, between the inner and outer layers, at least one of the following successive layers:
- optionally, a first binder layer, arranged on the inner layer,
- at least one intermediate layer, and
  - optionally, a second binder layer arranged between the intermediate layer and the outer layer.

According to another embodiment, each intermediate layer may comprise:
- either an adhesive or binder composition,
- or a barrier material, which may be chosen from:
  - either compositions based on ethylene-vinyl alcohol copolymers (EVOH), low-carbon polyamides, amorphous polyamides of high Tg (80-200° C.), such as coPA6.I, I being terephthalic acid, semicrystalline polyphthalamides, alone, as a mixture, or compositions thereof based on functionalized or non-functionalized olefin(s), plasticizer, impact modifier, stabilizer and other additives or polyamide A as defined above,
  - or compositions based on polymers functionalized with anhydride or with another function that is reactive with the amine or acid chain ends, for instance fluoro polymers, such as functionalized polyvinylidene fluoride (PVDF), functionalized ethylene-tetrafluoroethylene copolymer (ETFE), functionalized ethylene-tetrafluoroethylene-hexafluoropropylene copolymer (EFEP), functionalized polyphenylene sulfide (PPS) or functionalized polybutylene naphthalate (PBN).

The term "functionalized" means the presence of reactive functions that can react with the chain ends of the polymers constituting the other layer.

According to another embodiment, the continuous phase of each of the layers of the structure may be constituted of polyamide.

In order to ensure the physical integrity of the multilayer structure and to avoid problems, for instance leaks at the joint, the compositions of the layers, and in particular those of the binders, will preferably be such that the peel force (of the weakest of the interfaces) is at least 20 N/cm (peeling performed at 50 mm/minute at an angle of 90°) after immersing the structure in biodiesel B30 for 200 hours at 80° C.

The thickness of the inner and outer layers of the structure according to the invention may be between 50 and 950 μm, limits inclusive.

The structures described above may be in the form of a pipe, a container, a film or a plate, preferably a pipe.

The invention also relates to the use of the structure as defined above for transporting or storing fluids, in particular fluids present in vehicles and other locomotion means.

The targeted fluids may be a polar and/or apolar fluid and may be chosen especially from an oil, a brake fluid, urea solutions, glycol-based coolant liquids, and combustibles, in particular biocombustibles.

Among the biocombustibles, mention may be made of mixtures of fuels and of alcohol and most particularly biofuels, which are mixtures of diesel and of ester of plant origin. Mention may be made of rapeseed oil (known as RME) and soybean oil (known as SME).

The examples that follow serve to illustrate the invention without, however, being limiting in nature.

EXAMPLES

I/Examples of Compositions

Examples of compositions of layers that are compatible with multilayer structures in accordance with the invention and used in the examples of multilayer types are given below.

The compositions are typically prepared by extrusion compounding, which is a technique known to those skilled in the art. Variants are possible, for instance the "dry-blend" technique. The thermoplastic compositions of the examples are manufactured via the technique of compounding in a co-rotating gear twin-screw extruder such as the 40 mm Werner & Pfleiderer Super-Compounder at a throughput rate of 70 kg/hour and a speed of 300 rpm. The temperature of the machine depends on the type of polymer under consideration. Care is taken to ensure that the polymers of the composition have all been melted by the machine, i.e. that the machine is at a temperature sufficiently higher than the melting point of the highest-melting polymer of the composition.

For compositions containing PA11, PA12, PA6, PA610, PA612, PA614, MXD6, EVOH, PVDF or amPASA, the compounding is performed by placing the extruder at 270° C. on its heating zones.

For compositions based on PA1210T or ETFE, the process should be performed at 280° C.

For compositions based on PPA or PPAa, the process should be performed at 310° C.

For compositions based on PPAb, the process should be performed at 320° C.

PA1210T-Cu denotes a coPA12/10.T, i.e. a copolyamide 12 with 50 mol % of 10.T, 10.T corresponding to the C10 linear diamine and T to terephthalic acid, this copolymer being of Mn 20 000, this copolymer being stabilized with 0.5% stabilizer based on copper iodide and potassium iodide of Polyadd P201 type (from Ciba). This stabilizer is constituted of 10% copper iodide, 80% potassium iodide and 10% zinc stearate.

PA11Cu denotes a composition based on polyamide 11 of Mn (number-average molecular mass) 29 000, containing 5% plasticizer BBSA (benzyl butyl sulfonamide), 6% impact modifier of ethylene/ethyl acrylate/anhydride type in a 68.5/30/1.5 mass ratio (MFI 6 at 190° C. under 2.16 kg) and 0.5% stabilizer based on copper iodide and potassium iodide of Polyadd P201 type (from Ciba).

PA11Impact denotes a composition based on polyamide 11 of Mn (number-average molecular mass) 29 000, containing 20% impact modifier of the ethylene/ethyl acrylate/anhydride type in a 68.5/30/1.5 mass ratio (MFI 6 at 190° C. under 2.16 kg), and 0.5% stabilizer based on copper iodide and potassium iodide of Polyadd P201 type (from Ciba).

PA11Ccu denotes a composition based on polyamide 11 of Mn (number-average molecular mass) 29 000, containing 5% plasticizer BBSA (benzyl butyl sulfonamide), 6% impact modifier of ethylene/butyl acrylate/anhydride type in a 79/18/3 mass ratio (MFI 5 at 190° C. under 2.16 kg), and 0.5% stabilizer based on copper iodide and potassium iodide of Polyadd P201 type (from Ciba).

PA11CTL denotes a composition based on polyamide 11 of Mn (number-average molecular mass) 29 000, containing 5% plasticizer BBSA (benzyl butyl sulfonamide), 6% impact modifier of ethylene/butyl acrylate/anhydride type in a 79/18/3 mass ratio (MFI 5 at 190° C. under 2.16 kg), and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

PA11ImpactTL denotes a composition based on polyamide 11 of Mn (number-average molecular mass) 29 000, containing 20% impact modifier of ethylene/ethyl acrylate/anhydride type in a 68.5/30/1.5 mass ratio (MFI 6 at 190° C. under 2.16 kg), and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

PA12-Cu denotes a composition based on polyamide 12 of Mn (number-average molecular mass) 35 000, containing 6% plasticizer BBSA (benzyl butyl sulfonamide), 6% anhydride-functionalized EPR Exxelor VA1801 (from Exxon) and 0.5% stabilizer based on copper iodide and potassium iodide of Polyadd P201 type (from Ciba).

PA11CuB denotes a composition based on polyamide 11 of Mn (number-average molecular mass) 29 000, containing 7% plasticizer BBSA (benzyl butyl sulfonamide) and 0.5% stabilizer Bruggolen H3373 of mineral type from the company Bruggemann.

PA11CuBH denotes a composition based on polyamide 11 of Mn (number-average molecular mass) 29 000, containing 7% plasticizer BBSA (benzyl butyl sulfonamide) and 0.5% stabilizer Bruggolen H3337 of mineral type from the company Bruggemann.

PA11BCu denotes a composition based on polyamide 11 of Mn (number-average molecular mass) 29 000, containing 5% plasticizer BBSA (benzyl butyl sulfonamide), 6% functionalized EPR Exxelor VA1801 (from Exxon) and 0.5% stabilizer based on copper iodide and potassium iodide of Polyadd P201 type (from Ciba).

PA1010Cu denotes a composition based on polyamide 10.10 of Mn (number-average molecular mass) 33 000, containing 10.5% plasticizer BBSA (benzyl butyl sulfonamide), 12% anhydride-functionalized EPR Exxelor VA1801 (from Exxon) and 0.5% stabilizer based on copper iodide and potassium iodide of Polyadd P201 type (from Ciba).

PPAd denotes a polyphthalamide-based composition of the copolyamide 6.T/6 Ultramid TKR4351 type from the company BASF, 25% functionalized EPR Exxelor VA1803 (from Exxon) and 0.5% stabilizer based on copper iodide and potassium iodide of Polyadd P201 type (from Ciba).

PA11-TL denotes a composition based on polyamide 11 of Mn (number-average molecular mass) 29 000, containing 5% plasticizer BBSA (benzyl butyl sulfonamide), 6% impact modifier of ethylene/ethyl acrylate/anhydride type in a 68.5/30/1.5 mass ratio (MFI 6 at 190° C. under 2.16 kg), and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba).

PA12-TL denotes a composition based on polyamide 12 of Mn (number-average molecular mass) 35000, containing 6% plasticizer BBSA (benzyl butyl sulfonamide), 6% anhydride-functionalized EPR Exxelor VA1801 (from Exxon), and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba). The melting point of this composition is 175° C.

PA1210T-TL denotes a coPA11/10.T, i.e. a copolyamide 11 with 50 mol % of 10.T, 10.T corresponding to the linear $C_{10}$ diamine and T to terephthalic acid, this copolymer being of Mn 20 000, this copolymer being stabilized with 1.2% organic stabilizers constituted of 0.8% phenol (Lowinlox 44B25 from the company Great Lakes), 0.2% phosphite (Irgafos 168 from the company Ciba) and 0.2% UV stabilizer (Tinuvin 312 from the company Ciba).

PA11CTL denotes a composition based on polyamide 11 of Mn (number-average molecular mass) 29 000, containing 5% plasticizer BBSA (benzyl butyl sulfonamide), 6% impact modifier of ethylene/butyl acrylate/anhydride type in a 79/18/3 mass ratio (MFI 5 at 190° C. under 2.16 kg), and 1.2% organic stabilizers (constituted of 0.8% phenol Lowinox 44B25 from the company Great Lakes, 0.2% phosphite Irgafos 168 from the company Ciba and 0.2% UV stabilizer Tinuvin 312 from the company Ciba).

PA11Impact-TL denotes a composition based on polyamide 11 of Mn (number-average molecular mass) 29 000, containing 20% impact modifier of ethylene/ethyl acrylate/anhydride type in a 68.5/30/1.5 mass ratio (MFI 6 at 190° C. under 2.16 kg), and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba).

PA11CondTL denotes a composition based on polyamide 11 of Mn (number-average molecular mass) 29 000, containing 7% plasticizer BBSA (benzyl butyl sulfonamide), 15% functionalized EPR Exxelor VA1801 (from Exxon), 18% carbon black of Ensaco 250 type from the company 3M, and 0.5% stabilizer of the phenol type Irganox 1010 from the company Ciba.

PA6OyE denotes an alloy composed of a matrix made of polyamide 6 of Mn 18 000 (for example Ultramid B3 from the company BASF) and 25% hdPE (high-density polyethylene) of density 0.96 and of melt flow index 0.3 (at 190° C. under 2.16 kg), 10% functionalized EPR Exxelor VA1803 (from Exxon), 8% plasticizer BBSA (benzyl butyl sulfonamide), and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba), the whole making 100%.

PA6a denotes a composition based on polyamide 6 of Mn (number-average molecular mass) 28 000, containing 10% plasticizer BBSA (benzyl butyl sulfonamide), 12% functionalized EPR Exxelor VA1803 (from Exxon) and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba).

PA6pl denotes a composition based on polyamide 6 of Mn (number-average molecular mass) 18 000, containing 12% plasticizer BBSA and 1.2% organic stabilizers constituted of 0.8% phenol (Lowinox 44B25 from the company Great Lakes), 0.2% phosphite (Irgafos 168 from the company Ciba) and 0.2% UV stabilizer (Tinuvin 312 from the company Ciba). The melting point of this composition is 215° C.

PPAb denotes a polyphthalamide-based composition of the type copolyamide 6.T/6 Ultramid TKR4351 from the company BASF, 25% functionalized EPR Exxelor VA1803 (from Exxon) and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

PPAa denotes a polyphthalamide-based composition of the type coPA6.T/6.I/6.6 Amodel EXT1800 from the company Solvay.

PA6Oy denotes an alloy composed of a matrix made of polyamide 6 of Mn 18 000 (for example Ultramid B3 from the company BASF) and 30% hdPE (high-density polyethylene) of density 0.96 and of melt flow index 0.3 (at 190° C. under 2.16 kg), 7% hdPE functionalized by grafting with 1% maleic anhydride, with a melt flow index of 1 (at 190° C. under 2.16 kg), 1.2% organic stabilizers (constituted of 0.8% phenol Lowinox 44B25 from the company Great Lakes), 0.2% phosphite Irgafos 168 from the company Ciba, and 0.2% UV stabilizer Tinuvin 312 from the company Ciba), the whole making 100%.

PPAOyTL denotes an alloy composed of a matrix made of polyphthalamide of copolyamide 6.T/6 type with Ultramid TKR4351 from the company BASF, and 20% hdPE (high-density polyethylene) of density 0.96 and of melt flow index 0.3 (at 190° C. under 2.16 kg), 15% functionalized EPR Exxelor VA1803 (from Exxon) and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

PVDFf denotes a composition based on PVDF de MFT 5 (at 235° C., under 5 kg) functionalized with maleic anhydride to a proportion of 0.5% by mass.

ETFE denotes a composition based on ETEE (ethylene-tetrafluoroethylene copolymer) known under the name EP7000, from the company Daikin. The melting point of this composition is 255° C.

EVOH denotes an ethylene-vinyl alcohol copolymer, for example Soarnol DC3203F from the company Nippon Gosei.

EVOH24 denotes an ethylene-vinyl alcohol copolymer, for example EVAL M100B from the company Kuraray, containing 24 mol % ethylene, having a melting point of 195° C., and an MFR (Melt Flow Rate) of 2.2 g/10 min at 210° C., according to ISO1133.

EVOH100 denotes an ethylene-vinyl alcohol copolymer containing 24% ethylene comonomer, manufactured by the company Eval under the name Eval M100B. The melting point of this composition is 194° C.

EVOHim denotes a composition based on EVOH and functionalized EPR impact modifier Exxelor VA1803 (from Exxon).

EFEP-C denotes an antistatic composition based on EFEP (ethylene-tetrafluoroethylene-hexafluoropropylene copolymer) known under the name RP5000AS, from the company Daikin. The melting point of this composition is 195° C.

amPASAa denotes a polyphthalamide-based composition of the copolyamide coPA6.I/6.T type, containing 70% by mass of unit 6.I, and 25% functionalized EPR Exxelor VA1803 (from Exxon) and 0.5% stabilizer based on copper iodide and potassium iodide of Polyadd P201 type (from Ciba). The glass transition temperature of this amorphous composition is 115° C.

Binders:

| Binder 1 | PA6.10 + 18% PA6 + 18% PA12 + 10% coPE/EA/MAH Lotader + stab1 1% |
| Binder 2 | PA6.12 + 18% PA6 + 18% PA12 + 10% coPE/EA/MAH Lotader + stab1 1% |
| Binder 3 | PA6.14 18% PA6 + 18% PA12 + 10% coPE/EA/MAH Lotader + stab1 1% |
| Binder 4 | PA6.10 + 18% PA6 + 18% PA12 + 10% coPE/EA/MAH Lotader + StabCu 0.7% |
| Binder 5 | PA6.12 + 18% PA6 + 18% PA12 + 10% EPR1 + StabCu 0.7% |
| Binder 6 | 28% PA6.10 + 18% PA6 + 18% PA12 + 10% hdPEf + 25% hdPE + stab1 1% |
| Binder 7 | 12% PA6.10 + 24% PA6 + 10% CoPE/EA/MAH (Lotader) + 45% PA11 + 8% plasticizer + 1% Stab 1 |
| Binder 8 | 12% PA6.10 + 24% PA6 + 10% CoPE/EA/MAH (Lotader) + 45% PA12 + 8% plasticizer + 1% Stab 1 |
| Binder 9 | 12% PA6.10 + 41% PA6f + 10% CoPE/EA/MAH (Lotader) + 24% PA12 + 12% plasticizer + 1% Stab 1 |
| Binder 10 | 12% PA6.12 + 41% PA6f + 10% CoPE/EA/MAH (Lotader) + 24% PA12 + 12% plasticizer + 1% Stab 1 |
| Binder 11 | 12% PA6.12 + 41.3% PA6f + 10% EPR1 + 24% PA12 + 12% plasticizer + 0.7% Stab Cu |
| Binder 12 | 45% PA6.12 + 18% PPA + 10% EPR1 + 18% PA12 + 8% plasticizer + 1% Stab 1 | with

PA6.10 meaning Polyamide 6.10 of Mn (number-average molecular mass) 30 000 and having an excess of amine NH2 chain end relative to the COON chain end, the concentration of NH2 chain end being 45 µeq/g. Its heat of fusion is 61 kJ/kg.

PA6.12 meaning Polyamide 6.12 of Mn (number-average molecular mass) 29 000 and having an excess of amine NH2 chain end relative to the COOH chain end, the concentration of NH2 chain end being 47 µeq/g. Its heat of fusion is 67 kJ/kg.

PA6.14 meaning Polyamide 6.14 of Mn (number-average molecular mass) 30 000 and having an excess of amine NH2 chain end relative to the COOH chain end, the concentration of NH2 chain end being 45 µeq/g. Its heat of fusion is 66 kJ/kg.

PA6 meaning Polyamide 6 of Mn (number-average molecular mass) 28 000. Its heat of fusion is 68 kJ/kg.

PA12 meaning Polyamide 12 of Mn (number-average molecular mass) 35 000. Its heat of fusion is 56 kJ/kg.

PA11 meaning Polyamide 11 of Mn (number-average molecular mass) 29 000. Its melting point is 190° C. and its heat of fusion is 56 kJ/kg.

PA6f means Polyamide 6 of Mn (number-average molecular mass) 18 000. The melting point of this composition is 220° C.

PPA means polyphthalamide of copolyamide 6T/6 type of 71%/29% mass proportion, of Mn 13 500, also sold under the name Ultramid TKR4351 by the company BASF. Its melting point is 295° C. and its heat of fusion is 34 kJ/kg.

coPE/EA/MAH meaning Ethylene-ethyl acrylate-maleic anhydride copolymer in a 68.5/30/1.5 mass ratio (MFI 6 at 190° C. under 2.16 kg) used as impact modifier.

EPR1 denoting a copolymer of ethylene and propylene of elastomeric nature functionalized with a group that is reacted with an anhydride function (at 0.5-1% by mass), of MFI 9 (at 230° C., under 10 kg), of the type Exxellor VA1801 from the company Exxon, used as impact modifier.

hdPE denotes a high-density polyethylene, of density 0.962, with a melting point of 136° C., of MFI at 190° C. under 2.16 kg of 0.6.

hdPEf denoting a high-density polyethylene functionalized with a reactive group that can react with one of the chain ends (or other reactive functions) of the polyamide, of density 0.960, of melting point 134° C., and of MFI, at 190° C. under 2.16 kg, of 2.

Stab1 denoting a mixture of organic stabilizers constituted of 0.8% phenol Lowinox 44B25 from the company Great Lakes and 0.2% phosphite Irgafos 168 from the company Ciba.

StabCu denoting a mixture of mineral stabilizers based on copper iodide and potassium iodide of Polyadd P201 type (from Ciba).

Plasticizer denoting benzyl butyl sulfonamide (BBSA)

Binder coPA denotes a composition based on 40% copolyamide 6/12 (of ratio 70/30 by mass) of Mn 16 000, and 40% copolyamide 6/12 (of ratio 70/30 by mass) of Mn 16 000.

Binder PPg denotes a composition based on PP (polypropylene) grafted with maleic anhydride, known under the name Admer QF551A from the company Mitsui.

Binder PA610+PA6 denotes a composition based on PA610 (of Mn 30 000, and as defined elsewhere) and 36% PA6 (of Mn 28 000, and as defined elsewhere) and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

Binder PA610+PA12 denotes a composition based on PA610 (of Mn 30 000, and as defined elsewhere) and 36% PA12 (of Mn 35 000, and as defined elsewhere) and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

Binder PA6+PA12+impact modifier denotes a composition based on 40% PA6 (of Mn 28 000, and as defined elsewhere), 40% PA12 (of Mn 35 000, and as defined elsewhere) and 20% functionalized EPR Exxelor VA1801 (from Exxon) and 1.2% organic stabilizers (constituted of 0.8% phenol Lowinox 44B25 from the company Great Lakes, 0.2% phosphite Irgafos 168 from the company Ciba, and 0.2% UV stabilizer Tinuvin 312 from the company Ciba).

2/Examples of Multilayer Structures According to the Invention

Unless otherwise mentioned, the examples are in the form of a pipe having an outside diameter of 8 mm with an inside diameter of 6 mm, i.e. a thickness of 1 mm. These dimensions are characteristic of the dimensions of pipes found in the motor vehicle field.

These pipes were manufactured by extrusion or coextrusion according to the standard processes for obtaining pipes.

The examples are featured in Table 1.

Table 1 gives the description of the multilayer pipes, with the chemical nature of each of the layers, their position and their respective thickness.

The outer layer is the layer in contact with the air, the inner layer is the layer in contact with the fluid rich in the oxidized species and/or radical products thereof derived from their decomposition, these fluids in particular being motor vehicle fluids, most particularly biocombustibles, even more particularly biodiesels.

Counterexamples, also referred to as comparative examples, are given after the examples in Table 2.

Table 3 gives the results of the experiments performed on each of the pipes defined in Table 1. The experiments performed are defined below. The two expected properties of the multilayer pipe enabling the technical problem to be solved:
good resistance to oxidative ageing combined with good resistance to peroxide are tested.

Other advantageous properties are then given, such as the measurement of the peel force to evaluate the adhesion between the layers of the structure, making the multilayer structure even more capable of fulfilling its function of conveying (or storing) motor vehicle fluids, in particular biocombustibles, most particularly biodiesels.

The results of the experiments performed on each of the pipes of the counterexamples are given in Table 4.

The structures of the counterexamples lead to poorer results than the structures according to the invention. For example, the structure of counterexamples 3 of Table 2: monolayer of PA11-TL, compared with structure 60 of Table 1: PA 11Cu/PA11-TL bilayer leads to poorer results in terms of oxidative ageing.

Table 5 details the extrusion parameters of structures 5 (5-layer structure), 13 (4-layer structure), 25 (3-layer structure) and 58 (2-layer structure) defined in Table 1.

In Table 3, the meanings of the terms used are as follows.

Oxidative Ageing

This is the resistance of the multilayer pipe to oxidative ageing in hot air. The pipe is aged in air at 150° C., and is then given a shock according to the standard DIN 73378, this shock being performed at −40° C.: the half-line (in hours) is indicated, which corresponds to the time after which 50% of the tested pipes break. A qualitative comment accompanies this value.

Scale of qualitative values:
VG+=very very good, corresponds to greater than 1750
VG=very good, corresponds to between 700 and 1750
G=good, corresponds to between 400 and 700 exclusive
Av.=average, corresponds to between 200 and 400 exclusive
P=poor/insufficient, corresponds to between 100 and 200 exclusive
VP=very poor, corresponds to less than 100.

Peroxide Resistance

This is the resistance of the multilayer structure to peroxidized fluid, this fluid being in contact with the inner layer. The following test is performed to simulate a stale combustible. The multilayer pipe is placed in contact internally with a peroxidized biocombustible with a PON number of about 200 (PON=peroxide number). This biocombustible is composed of a mixture of fuel B and methanol with a mass composition of 85%/15%. Per 1 liter of this biocombustible, 19.2 ml of solution containing 80% CHPO (cumene hydroperoxide), 0.73 g of copper stearate and 3 ml of acetic acid are added. This gives a biocombustible with a PON of about 200.

The pipe is exposed for a certain time to this biocombustible at 80° C., the temperature of the external air also being 80° C. Examples are taken regularly from the pipe and a DIN shock at −40° C. is performed to evaluate its state of degradation. The half-life is noted, which corresponds to the time at which 50% breakage is reached. The longer the half-life, the better the resistance of the pipe.

If it is longer than 1000 hours, it is excellent (noted VG).
Between 400 and 1000 hours, it is satisfactory (noted G).
Between 200 and 400 hours, it is average and unacceptable with the less unstable biocombustibles (noted Av.).
Between 100 and 200, it is poor and unacceptable (noted P).
At less than 100 hours, it is very poor (noted VP).

Adhesion

This is reflected by the measurement of the peel force, expressed in N/cm, and measured on a pipe that has been conditioned for 15 days at 50% relative humidity at 23° C. The value given concerns the weakest interface, i.e. the least adherent interface of the multilayer, when there is the greatest risk of delamination. Peeling at the interface is performed by subjecting one of the parts to traction at an angle of 90° and at a speed of 50 mm/minute.

The adhesion value is reported in N/cm. An adhesion value of greater than 30 N/cm is entirely satisfactory.

Advantageously, the multilayer structures according to the invention may have the following properties, in addition to the expected properties described above.

Biofuel CE10 Barrier

The barrier effect is described qualitatively and quantitatively by a permeation measurement. The lower the permeability or permeation, the better the barrier performance. This is a measurement of the dynamic permeation in fuel CE10 at 40° C. in g.mm/m$^2$/24 hours. The fuel CE10 comprises 10% ethanol and 90% reference petroleum stearate "fluid C", which is a mixture in identical amounts of isooctane and toluene. The fuel circulates inside the pipe, and air is outside.

Diesel Barrier

The permeability of diesel and of biodiesel is low, and the barrier effect is easy to obtain. A qualitative indication of whether the barrier effect is sufficient is given.

$ZnCl_2$

This is the resistance to zinc chloride. The pipes, bent beforehand with a radius of curvature of 40 mm, are immersed in a 50% solution $ZnCl_2$. The time after which cracks or the first break appear is noted.

The assessment criteria are as follows:
VG=very good, corresponds to a time≧1500 hours
G=good, corresponds to a time≧800 hours
Av.=average, corresponds to a time≧400 hours
P=poor, corresponds to a time≦100 hours
VP=very poor, corresponds to a time≦1 hour.

Flexibility

The flexibility of the multilayer pipe is described qualitatively and quantitatively. Good flexibility is advantageous for mounting on a vehicle.

The term "good flexibility" means a modulus of flexure of less than 1000 MPa measured according to the standard ISO 178.
VG 300-500 MPa
G+=500-700 MPa
G=700-900 MPa
Av.=900-1200 MPa
P=1500-2000 MPa
VP=≧2000 MPa.

Antistatic

This column indicates the antistatic character on the inner face of the multilayer pipe. The antistatic character is occasionally required in specifications for certain countries. This character conventionally corresponds to a superficial resistivity value of less than or equal to $10^6$ ohms. This character may thus be an additional advantage in certain countries.

Working Temperature

This column indicates the maximum temperature that the multilayer pipe can withstand without melting or becoming excessively deformed. A high temperature is an additional advantage in the case where the engine environment is particularly hot.

3/Example of Manufacture of the Multilayer Structures: in the Case of Pipes

The multilayer pipes are prepared by coextrusion. A McNeill industrial multilayer extrusion line, equipped with five extruders, connected to a spiral-mandrel multilayer extrusion head, is used. The screws used are single extrusion screws having pitch profiles adapted to polyamides. In addition to the five extruders and the multilayer extrusion head, the extrusion line comprises:

- a die-punch assembly, located at the end of the coextrusion head; the inside diameter of the die and the outside diameter of the punch are chosen as a function of the structure to be produced and of the materials of which it is composed, and also of the dimensions of the pipe and the line speed;
- a vacuum box with an adjustable pressure-reduction level. In this box circulates water generally maintained at 20° C., in which is immersed a gauge for conforming the pipe in its final dimensions. The diameter of the gauge is adapted to the dimensions of the pipe to be made, typically from 8.5 to 10 mm for a pipe with an outside diameter of 8 mm and a thickness of 1 mm;
- a succession of cooling tanks in which water is maintained at about 20° C., for cooling the pipe along the path from the head to the drawing bench;
- a diameter measurer;
- a drawing bench.

The 5-extruder configuration is used to produce pipes having from two layers to five layers. In the case of structures with less than five layers, several extruders are then fed with the same material.

In the case of the structures comprising six layers, an additional extruder is connected and a spiral mandrel is added to the existing head, in order to produce the inner layer, in contact with the fluid. Before the tests, in order to ensure that the pipe has the best properties and good extrusion quality, it is checked that the extruded materials have a residual moisture content before extrusion of less than 0.08%. If this is not the case, an additional step of drying the material is performed before the tests, generally in a vacuum dryer, overnight at 80° C.

Reference will be made to Appendix 3, which presents in detail in the extrusion parameters used for Examples 58 (2 layers), 25 (3 layers), 13 (4 layers) and 5 (5 layers) of Appendix 1, for the manufacture of pipes with an outside diameter of 8 mm and an inside diameter of 6 mm, i.e. a thickness of 1 mm.

For these four particular examples, as for all the others, the pipes, which satisfy the characteristics described in the present patent application, were taken, the extrusion parameters being stabilized, the nominal dimensions of the pipes no longer changing over time. The diameter is checked by a laser diameter measurer installed at the end of the line.

Generally, the line speed is typically 20 m/minute. It generally ranges between 5 and 100 m/minute.

The speed of the extruder screws depends on the thickness of the layer and on the diameter of the screw, as is known to those skilled in the art.

In general, the temperature of the extruders and tools (head and joint) should be set so as to be sufficiently higher than the melting point of the compositions under consideration, such that they remain in molten form, thus preventing them from solidifying and blocking the machine.

For the compositions PA11, PA12, PA6, PA610, PA612, PA614, EVOH and PVDF, a temperature of about 240° C., or even up to 260° C. if the product is particularly viscous, should be ensured. To do this, at least part of the heating zones of the machine, in particular the part downstream of the screw and the downstream tool (extrusion head and joint) is set at about 240° C., so as to obtain the nominal mix temperature.

For the compositions based on PA1210T or on ETFE, the process should be performed at about 270° C. For the compositions based on PPA or PPAa, the process should be performed at about 310° C. For the compositions based on PPAb, the process should be performed at about 320° C.

4/Comparative Tests

The following experiments were performed on two pipes according to the prior art (monolayer) and on a pipe having a multilayer structure according to the invention:

Exp 1: the oxidative ageing test in hot air, as defined above, was performed.

Exp 2; the peroxide resistance test, as defined above, was performed. It is pointed out that similar peroxide resistance results may be obtained with a pipe that has been immersed in this same biocombustible at 80° C.

Exp 3: the mixed test with hot air outside the pipe and peroxidized fuel inside the pipe is a combination of the two preceding tests. The peroxidized fuel is circulated at a temperature of 80° C. To the exterior is hot air at 150° C. (in the case of a fuel feed line).

|  | Exp 1: Resistance to hot air on the two faces | Exp 2: Resistance to peroxides on the inner face | Exp 3: Mixed resistance to hot air (exterior)/ peroxides (interior) |
|---|---|---|---|
| Monolayer PA pipe with a Cu mineral stabilizer Cx2: PA11Cu | Very good (2000 hours) | Poor (<200 hours ...) | Poor (<200 hours ...) |
| Monolayer PA pipe with an organic stabilizer (TL) Cx3: PA11-TL | Good (400 hours) | Very good (>1000 hours) | Average (320 hours) |
| Multilayer pipe according to the invention | Good to very good (1550 hours) | Very good (>1000 hours) | Good to very good (850 hours) |
| Ex 60: PA11Cu (ext)/PA11 TL (int) |  |  |  |

Similar tests were performed with the pipes comprising more than two layers, in particular the tests of the counterexamples Cx 16 and Cx 17 and of Example 5.

|  | Exp. 1 | Exp. 2 | Exp. 3 |
|---|---|---|---|
| Cx 16 | AB, 350 | VG, >1000 | Average (275 h) |
| Cx 17 | VG, 900 | M, <200 | Poor (<200 h) |
| 5 | VG, 700 | VG, >1000 | Good (600 h) |

The results of the above tables clearly show the real synergy between the compositions of the inner and outer layers, the results obtained during the Experiments 3 being markedly superior, from the point of view both of oxidative ageing and of resistance to peroxides, whether or not at least one intermediate layer is present, in the present case a layer of EVOH, and two layers of binder.

TABLE 1

| Ex. No. | outer layer | intermediate layers | | | inner layer | | thicknesses μm |
|---|---|---|---|---|---|---|---|
| 1 | PA11Cu | Binder 1 | PVDFf | Binder 1 | PA11-TL | | 400/50/100/50/400 |
| 2 | PA11Cu | Binder 1 | ETFE | Binder 1 | PA11-TL | | 400/50/100/50/400 |
|  | outer layer | intermediate layer | | | inner layer | | |
| 3 | PA11Cu | Binder 1 | | | EFEP-C | | 850/50/100 |
|  | outer layer | | | | inner layer | | |
| 4 | PA11Cu | | | | EFEP-C | | 900/100 |
|  | outer layer | intermediate layers | | | inner layer | | |
| 5 | PA11Cu | Binder 1 | EVOH | Binder 1 | PA11-TL | | 400/50/100/50/400 |
| 6 | PA11Cu | Binder 1 | EVOH24 | Binder 1 | PA11-TL | | 400/50/100/50/400 |
| 7 | PA12-Cu | Binder 1 | EVOH | Binder 1 | PA11-TL | | 400/50/100/50/400 |
| 8 | PA11Impact | Binder 1 | EVOH | Binder 1 | PA11-TL | | 400/50/100/50/400 |
| 9 | PA11Impact | Binder 1 | EVOH | Binder 1 | PA11Impact-TL | | 400/50/100/50/400 |
| 10 | PA11Cu | Binder 1 | EVOHim | Binder 1 | PA11-TL | | 400/50/100/50/400 |
| 11 | PA11-Cu | Binder 1 | EVOHim | Binder 1 | PA11CondTL | | 400/50/100/50/400 |
|  | outer layer | intermediate layers | | | inner layer | | |
| 12 | PA11-Cu | Binder 1 | EVOH | Binder 1 | PA11Impact | PA11CondTL | 400/50/100/50/325/75 |
| 13 | PA11Cu | Binder 1 | EVOH | PA6OyE | Binder 1 | PA11-TL | 225/50/100/350/50/225 |
|  | outer layer | intermediate layers | | | inner layer | | |
| 14 | PA11Cu | Binder 1 | EVOH | | PA6OyE | | 425/50/100/425 |
| 15 | PA11Cu | Binder 1 | EVOH24 | | PA6OyE | | 425/50/100/425 |
| 16 | PA11Cu | Binder 1 | EVOHim | | PA6OyE | | 425/50/100/425 |
| 17 | PA11Cu | Binder 1 | EVOH | | PPAb | | 425/50/100/425 |
|  | outer layer | intermediate layer | | | inner layer | | |
| 18 | Binder 4 | EVOH | | | Binder 1 | | 450/100/450 |
| 19 | Binder 5 | EVOH | | | Binder 2 | | 450/100/450 |
|  | outer layer | intermediate layers | | | inner layer | | |
| 20 | PA11Cu | Binder 1 | PPAa | | PA6OyE | | 425/50/100/425 |
| 21 | PA11Cu | Binder 1 | amPASAa | | PA6OyE | | 425/50/100/425 |

TABLE 1-continued

| Ex. No. | outer layer | intermediate layers | | | inner layer | thicknesses μm |
|---|---|---|---|---|---|---|
| | outer layer | intermediate layer | | | inner layer | |
| 22 | PA11Cu | Binder 1 | | | PA6a | 475/50/475 |
| 23 | PA11Cu | Binder 1 | | | PPAa | 475/50/475 |
| 24 | PA11Cu | Binder 1 | | | PPAb | 475/50/475 |
| 25 | PA1210T-Cu | Binder 1 | | | PPAb | 475/50/475 |
| | outer layer | intermediate layer | | | inner layer | |
| 26 | Binder 5 | PPAa | | | Binder 1 | 450/100/450 |
| | outer layer | intermediate layer | | | inner layer | |
| 27 | PA11Cu | Binder 1 | | | PA6Oy | 475/50/475 |
| 28 | PA11CuB | Binder 1 | | | PA6Oy | 475/50/475 |
| 29 | PA11CuBH | Binder 1 | | | PA6Oy | 475/50/475 |
| 30 | PA11BCu | Binder 1 | | | PA6Oy | 475/50/475 |
| 31 | PA11CCu | Binder 1 | | | PA6Oy | 475/50/475 |
| 32 | PA1210T-Cu | Binder 1 | | | PA6Oy | 475/50/475 |
| 33 | PA1010Cu | Binder 2 | | | PA6Oy | 475/50/475 |
| 34 | PA1012Cu | Binder 2 | | | PA6Oy | 475/50/475 |
| 35 | PA11Cu | Binder coPA | | | PA6Oy | 475/50/475 |
| 36 | PA11Cu | Binder PPg | | | PA6Oy | 475/50/475 |
| 37 | PA11Cu | Binder PA610 + PA6 | | | PA6Oy | 475/50/475 |
| 38 | PA11Cu | Binder PA610 + PA12 | | | PA6Oy | 475/50/475 |
| 39 | PA11Cu | Binder PA6 + PA12 + impact modifier | | | PA6Oy | 475/50/475 |
| 40 | PA11Cu | Binder 1 | | | PA6OyE | 475/50/475 |
| | outer layer | intermediate layers | | | Inner layer | |
| 41 | PA11Cu | Binder 1 | PA6Oy | | PA6a | 475/50/325/150 |
| | outer layer | intermediate layer | | | inner layer | |
| 42 | PA11Impact | Binder 1 | | | PA6Oy | 475/50/475 |
| 43 | PA11Impact | Binder 1 | | | PA6OyE | 475/50/475 |
| | outer layer | intermediate layers | | | inner layer | |
| 44 | PA11Cu | Binder 1 | PA6Oy | | Binder 1 | 475/50/325/150 |
| | outer layer | intermediate layers | | | inner layer | |
| 45 | PA11Impact | Binder 1 | PA6Oy | Binder 1 | PA11-TL | 225/50/450/50/225 |
| 46 | PA11Cu | Binder 1 | PA6Oy | Binder 1 | PA11-TL | 225/50/450/50/225 |
| 47 | PA11Cu | Binder 1 | PPAb | Binder 1 | PA11-TL | 390/50/120/50/390 |
| 48 | PA11Cu | Binder 1 | amPASAa | Binder 1 | PA11-TL | 390/50/120/50/390 |
| | outer layer | Intermediate layer | | | inner layer | |
| 49 | PA11Cu | Binder 1 | | | PPAOyTL | 475/50/475 |
| | outer layer | Intermediate layer | | | inner layer | |
| 50 | Binder 4 | PA6Oy | | | Binder 1 | 250/500/250 |
| 51 | Binder 5 | PA6Oy | | | Binder 2 | 250/500/250 |
| 52 | Binder 4 | PA6Oy | | | Binder 3 | 250/500/250 |
| | outer layer | | | | inner layer | |
| 53 | Binder 4 | | | | PPAa | 500/500 |
| 54 | PA1210T-Cu | | | | PPAa | 500/500 |
| | outer layer | | | | inner layer | |
| 55 | PA11Cu | | | | Binder 6 | 500/500 |
| | outer layer | Intermediate layer | | | inner layer | |
| 56 | PA11Cu | Binder 1 | | | PA11-TL | 475/50/475 |
| 57 | PA11Cu | Binder 6 | | | PA11-TL | 475/50/475 |
| | outer layer | | | | inner layer | |
| 58 | Binder 4 | | | | Binder 1 | 500/500 |
| 59 | Binder 5 | | | | Binder 6 | 500/500 |

TABLE 1-continued

| Ex. No. | outer layer | intermediate layers | inner layer | thicknesses μm |
|---|---|---|---|---|

| | outer layer | | inner layer | |
|---|---|---|---|---|
| 60 | PA11Cu | | PA11-TL | 500/500 |
| 61 | PA11Impact | | PA11-TL | 500/500 |
| 62 | PA11Cu | | PA1210T-TL | 500/500 |
| 63 | PA1210T-Cu | | PA1210T-TL | 500/500 |
| 64 | PA11CCu | | PA11-TL | 500/500 |
| 65 | PA11CCu | | PA11CTL | 500/500 |
| 66 | PA11Impact | | PA11CTL | 500/500 |
| 67 | PA11Impact | | PA11ImpactTL | 500/500 |
| 68 | PA11Cu | | PA11CondTL | 950/50 |

| | outer layer | Intermediate layer | Inner layer | |
|---|---|---|---|---|
| 69 | PA11Cu | PA11Impact | PA11CondTL | 900/50/50 |

| Ex. No. | outer layer | | | | inner layer | thicknesses |
|---|---|---|---|---|---|---|
| 70 | PPAd | | | | PPAb | |
| 71 | PA12-Cu | Binder 9 | | | PA12-TL | 250/500/250 |
| 72 | PA12-Cu | Binder 10 | | | PA12-TL | 250/500/250 |
| 73 | PA12-Cu | Binder 11 | | | PA12-TL | 250/500/250 |
| 74 | PA12-Cu | Binder 12 | | | PA12-TL | 250/500/250 |
| 75 | PA12-Cu | Binder 1 | EVOH | PA6pIE | PPAb | 400/50/100/350/100 |
| 76 | PA12-Cu | Binder 9 | EVOH 100 | Binder 9 | PPAb | 250/200/100/350/100 |
| 77 | PA12-Cu | Binder 11 | EVOH | PPAb | Binder 9 | 200/200/100/100/400 |
| 78 | PA12-Cu | Binder 1 | PA6pIE | | PPAb | 250/50/450/250 |
| 79 | PA12-Cu | Binder 1 | PPAb | | PA6pIE | 350/50/200/400 |

TABLE 2

| | Counter examples | |
|---|---|---|
| Cx1 | PA12-Cu | Thickness in μm: 1000 |
| Cx2 | PA11Cu | 1000 |
| Cx3 | PA11-TL | 1000 |
| Cx4 | PA11 CondTL | 1000 |
| Cx5 | PA11Impact | 1000 |
| Cx6 | PA11CCu | 1000 |
| Cx7 | 50:50 mixture PA11CCu + PA11CTL | 1000 |
| Cx8 | Binder 1 | 1000 |
| Cx9 | Binder 2 | 1000 |
| Cx10 | Binder 4 | 1000 |
| Cx11 | Binder 5 | 1000 |
| Cx12 | PA6Oy | 1000 |
| Cx13 | PA6a | 1000 |
| Cx14 | PPAb | 1000 |
| Cx15 | PPAa | 1000 |

| | outer layer | intermediate layers | | | inner layer | |
|---|---|---|---|---|---|---|
| Cx16 | PA11-TL | Binder 1 | EVOH | Binder 1 | PA11-TL | 400/50/100/50/400 |
| Cx17 | PA11Cu | Binder 1 | EVOH | Binder 1 | PA11Cu | 400/50/100/50/400 |

| | outer layer | Intermediate layer | inner layer | |
|---|---|---|---|---|
| Cx18 | PA11-TL | Binder 1 | PA6a | 475/50/475 |
| Cx19 | PA11-TL | Binder 1 | PPAa | 475/50/475 |
| Cx20 | PPAd | | | 1000 |

TABLE 3

| Ex. No. | Oxidative ageing | Peroxide resistance | Adhesion | CE10 biofuel barrier | Diesel barrier | ZnCl2 resistance | Flexibility | Antistatic nature | Working temperature |
|---|---|---|---|---|---|---|---|---|---|
| 1 | VG, 1100 | VG, >1000 | >30 | very good, <30 | sufficient | VG | G | | |
| 2 | VG, 950 | VG, >1000 | >30 | very good, <50 | sufficient | VG | G | | |
| 3 | VG, 975 | VG, >1000 | >30 | very good, <50 | sufficient | VG | G | yes | |
| 4 | VG, 950 | VG, >1000 | >30 | very good, <50 | sufficient | VG | G | yes | |

TABLE 3-continued

| Ex. No. | Oxidative ageing | Peroxide resistance | Adhesion | CE10 biofuel barrier | Diesel barrier | ZnCl2 resistance | Flexibility | Antistatic nature | Working temperature |
|---|---|---|---|---|---|---|---|---|---|
| 5 | VG, 700 | VG, >1000 | >30 | very good, <30 | sufficient | VG | G | | |
| 6 | G, 600 | VG, >1000 | >30 | very good, <30 | sufficient | VG | G | | |
| 7 | G, 450 | VG, >1000 | >30 | very good, <30 | sufficient | VG | G | | |
| 8 | VG, 850 | VG, >1000 | >30 | very good, <30 | sufficient | VG | G | | |
| 9 | VG, 975 | VG, >1000 | >30 | very good, <30 | sufficient | VG | G | | |
| 10 | VG 850 | VG, >1000 | >30 | very good, <30 | sufficient | VG | G+ | | |
| 11 | G 475 | G, >400 | >30 | very good, <30 | sufficient | VG | G | yes | |
| 12 | G 475 | G, >400 | >30 | very good, <30 | sufficient | VG | G | yes | |
| 13 | VG, 750 | VG, >1000 | >30 | very good, <30 | sufficient | VG | G+ | | |
| 14 | G, 650 | G, >400 | >30 | very good, <30 | sufficient | | | | |
| 15 | G, 575 | G, >400 | >30 | very good, <30 | sufficient | | | | |
| 16 | VG, 725 | G, >400 | >30 | very good, <30 | sufficient | P | G+ | | |
| 17 | VG, 775 | G, >400 | >30 | very good, <30 | sufficient | Av. | Av. | | |
| 18 | G, 400 | G, >400 | >30 | very good, <30 | sufficient | Av. | | | |
| 19 | Av., 350 | G, >400 | >30 | very good, <30 | sufficient | Av. | | | |
| 20 | VG, 1050 | G, >400 | >30 | very good, <30 | sufficient | P | Av. | | |
| 21 | VG, 850 | G, >400 | >30 | good, <100 | sufficient | P | Av. | | |
| 22 | Av., 375 | Av., >200 | >30 | poor, >100 | sufficient | VP | G+ | | |
| 23 | VG, 800 | G, >400 | >30 | very good, <30 | sufficient | Av. | Av. | | |
| 24 | VG, 875 | G, >400 | >30 | very good, <30 | sufficient | Av. | Av. | | |
| 25 | VG, 725 | G, >400 | >30 | very good, <30 | sufficient | Av. | Av. | | >200° C. |
| 26 | Av., 325 | G, >400 | >30 | very good, <30 | | Av. | | | |
| 27 | VG, 1100 | G, >400 | >30 | good, <100 | sufficient | P | G | | |
| 28 | VG, 900 | G, >400 | >30 | good, <100 | sufficient | P | G | | |
| 29 | VG, 850 | G, >400 | >30 | good, <100 | sufficient | P | G | | |
| 30 | VG, 950 | G, >400 | >30 | good, <100 | sufficient | P | G | | |
| 31 | VG, 1100 | G, >400 | >30 | good, <100 | sufficient | P | G | | |
| 32 | G, 675 | G, >400 | >30 | good, <100 | sufficient | P | G | | >200° C. |
| 33 | VG, 750 | G, >400 | >30 | good, <100 | sufficient | P | G | | |
| 34 | VG, 825 | G, >400 | >30 | good, <100 | | P | G | | |
| 35 | VG, 1000 | G, >400 | >30 | good, <100 | sufficient | P | G | | |
| 36 | G, 675 | G, >400 | >30 | good, <100 | sufficient | P | G | | |
| 37 | VG, 850 | G, >400 | >30 | good, <100 | sufficient | P | G | | |
| 38 | VG, 950 | G, >400 | >30 | good, <100 | sufficient | P | G | | |
| 39 | VG, 1000 | G, >400 | >30 | good, <100 | sufficient | P | G | | |
| 40 | VG, 1300 | G, >400 | >30 | good, <100 | sufficient | P | G+ | | |
| 41 | G, 550 | Av., >200 | >30 | good, <100 | sufficient | P | G | | |
| 42 | VG, 1200 | G, >400 | >30 | good, <100 | sufficient | P | G | | |
| 43 | VG, 1450 | G, >400 | >30 | good, <100 | sufficient | P | G+ | | |
| 44 | VG, 1000 | G, >400 | >30 | good, <100 | sufficient | Av. | G | | |
| 45 | VG, 1750 | VG, >1000 | >30 | good, <100 | sufficient | VG | Av. | | |
| 46 | VG, 1350 | VG, >1000 | >30 | good, <100 | sufficient | VG | Av. | | |
| 47 | VG, 1425 | VG, >1000 | >30 | very good, <30 | sufficient | VG | Av. | | |
| 48 | VG, 1225 | VG, >1000 | >30 | very good, <30 | sufficient | VG | Av. | | |
| 49 | VG, 1325 | G, >400 | >30 | very good, <30 | sufficient | Av. | Av. | | |
| 50 | Av., 325 | G, >400 | >30 | good, <100 | sufficient | Av. | Av. | | |
| 51 | Av., 200 | G, >400 | >30 | good, <100 | sufficient | Av. | Av. | | |
| 52 | G, 475 | G, >400 | >30 | good, <100 | sufficient | Av. | Av. | | |
| 53 | Av., 375 | G, >400 | >30 | very good, <30 | sufficient | Av. | P | | >200° C. |
| 54 | VG, 700 | G, >400 | >30 | very good, <30 | sufficient | Av. | P | | >220° C. |
| 55 | G, 550 | G, >400 | >30 | good, <100 | sufficient | Av. | G+ | | |
| 56 | VG, 1300 | VG, >1000 | >30 | poor, >100 | sufficient | VG | G+ | | |
| 57 | VG, 1475 | VG, >1000 | >30 | good, <100 | sufficient | VG | G+ | | |
| 58 | G, 450 | G, >400 | >30 | poor, >100 | sufficient | Av. | G | | |
| 59 | G, 475 | G, >400 | >30 | good, <100 | sufficient | Av. | G | | |
| 60 | VG, 1550 | VG, >1000 | >30 | poor, >100 | sufficient | VG | G+ | | |
| 61 | VG+, 2350 | VG, >1000 | >30 | poor, >100 | sufficient | VG | G+ | | |
| 62 | VG, 1150 | VG, >1000 | >30 | poor, >100 | sufficient | VG | G+ | | |
| 63 | VG, 775 | VG, >1000 | >30 | poor, >100 | sufficient | VG | G+ | | >220° C. |
| 64 | VG, 1200 | VG, >1000 | >30 | poor, >100 | sufficient | VG | G+ | | |
| 65 | VG, 1750 | VG, >1000 | >30 | poor, >100 | sufficient | VG | G+ | | |
| 66 | VG+, 2800 | VG, >1000 | >30 | poor, >100 | sufficient | VG | G+ | | |
| 67 | VG+, 3100 | VG, >1000 | >30 | poor, >100 | sufficient | VG | G+ | | |
| 68 | G, 625 | G, >400 | >30 | poor, >100 | sufficient | VG | G | yes | |
| 69 | VG, 925 | G, >400 | >30 | poor, >100 | sufficient | VG | G | yes | |
| 70 | G+, >400 | VG, >1000 | >30 | nc | sufficient | VG | P | | |
| 71 | G+, >400 | VG, >1000 | >30 | nc | sufficient | VG | P | | |
| 72 | G+, >400 | VG, >1000 | >30 | nc | sufficient | VG | P | | |
| 73 | G+, >400 | VG, >1000 | >30 | nc | sufficient | VG | P | | |
| 74 | G+, >400 | VG, >1000 | >30 | nc | sufficient | VG | P | | |
| 75 | G+, >400 | G, >400 | >30 | very good, <3 | sufficient | Av. | P | | |
| 76 | G+, >400 | G, >400 | >30 | very good, <3 | sufficient | Av. | P | | |
| 77 | G+, >400 | G, >400 | >30 | very good, <3 | sufficient | P | P | | |
| 78 | G+, >400 | G, >400 | >30 | very good, <30 | sufficient | Av. | P | | |
| 79 | G+, >400 | Av., >200 | >30 | very good, <30 | sufficient | VP | P | | |

TABLE 4

Counter examples

| Ex. No. | Oxidative ageing | Peroxide resistance | Adhesion | CE10 biofuel barrier | Diesel barrier | ZnCl2 resistance | Flexibility | Antistatic nature |
|---|---|---|---|---|---|---|---|---|
| Cx1 | VG, 1600 | VP, <100 | | poor, >100 | sufficient | | | |
| Cx2 | VG+, 2000 | P, <200 | | poor, >100 | sufficient | | | |
| Cx3 | G, 400 | VG, >1000 | | poor, >100 | sufficient | | | |
| Cx4 | P, 175 | G, >400 | | | | | | |
| Cx5 | VG+, 3100 | P, <200 | | poor, >100 | sufficient | | | |
| Cx6 | VG+, 2100 | VP, <100 | | poor, >100 | sufficient | | | |
| Cx7 | VG, 1400 | VP, <100 | | poor, >100 | sufficient | | | |
| Cx8 | P, 110 | G, >400 | | poor, >100 | sufficient | | | |
| Cx9 | P, 125 | G, >400 | | | | | | |
| Cx10 | G, 550 | VP, <100 | | poor, >100 | sufficient | | | |
| Cx11 | | VP, <100 | | | | | | |
| Cx12 | P, 150 | G, >400 | | good, <100 | sufficient | | | |
| Cx13 | VP, <75 | P, <200 | | | | | | |
| Cx14 | P, 175 | G, >400 | | very good, <30 | sufficient | | | |
| Cx15 | P, <200 | G, >400 | | | | | | |
| Cx16 | Av., 350 | VG, >1000 | | very good, <30 | sufficient | | | |
| Cx17 | VG, 900 | P, <200 | | very good, <30 | sufficient | | | |
| Cx18 | P, 120 | Av., >200 | >30 | poor, >100 | sufficient | | | |
| Cx19 | P, 150 | G, >400 | >30 | very good, <30 | sufficient | | | |
| Cx20 | | VP, <100 | | very good, <30 | sufficient | | | |

TABLE 5

| | exmples annexe 1n° | | | |
|---|---|---|---|---|
| | 5<br>5 layers | 13<br>4 layers | 25<br>3 layers | 58<br>2 layers |
| Extruder 1, internal | PA11-TL | PA6OYE | PA6OY | PA11-TL |
| Z1, °C. | 180 | 200 | 200 | 190 |
| Z2, °C. | 200 | 220 | 220 | 240 |
| Z3, °C. | 220 | 240 | 240 | 245 |
| Z4, °C. | 230 | 240 | 240 | 250 |
| Z5, °C. | 240 | 240 | 240 | 250 |
| Z6, °C. | 240 | 240 | 240 | 250 |
| Z7, °C. | 240 | 240 | 240 | 250 |
| Screw Rotation, rpm | 28.3 | 35 | 28.3 | 26.2 |
| Couple, % | 38 | 24 | 28 | 30 |
| Pressure, bar | 299 | 142 | 194 | 351 |
| Extruder 2 | Binder 1 | EVOH | PA6OY | PA11-TL |
| Z1, °C. | 170 | 200 | 200 | 190 |
| Z2, °C. | 190 | 220 | 220 | 240 |
| Z3, °C. | 210 | 240 | 240 | 240 |
| Z4, °C. | 240 | 240 | 240 | 240 |
| Z5, °C. | 240 | 240 | 240 | 240 |
| Screw Rotation, rpm | 17 | 32.5 | 30.3 | 56.7 |
| Couple, % | 33 | 28 | 18 | 52 |
| Pressure, bar | 73 | 83 | 81 | 128 |
| Extruder 3 | EVOH | PA11Cu | PA11Cu | PA11Cu |
| Z1, °C. | 170 | 190 | 200 | 190 |
| Z2, °C. | 190 | 210 | 220 | 240 |
| Z3, °C. | 210 | 230 | 240 | 240 |
| Z4, °C. | 230 | 240 | 250 | 240 |
| Z5, °C. | 240 | 240 | 250 | 240 |
| Z6, °C. | 240 | 240 | 250 | 240 |
| Z7, °C. | 240 | 240 | 250 | 240 |
| Screw Rotation, rpm | 9.6 | 28.6 | 32.3 | 27.4 |
| Couple, % | 40 | 40 | 32 | 28 |
| Pressure, bar | 97 | 281 | 100 | 130 |
| Extruder 4 | Binder 1 | Binder 1 | Binder 1 | PA11-TL |
| Z1, °C. | 190 | 190 | 200 | 190 |
| Z2, °C. | 220 | 210 | 220 | 240 |
| Z3, °C. | 230 | 230 | 240 | 240 |
| Z4, °C. | 240 | 260 | 250 | 240 |
| Z5, °C. | 240 | 260 | 270 | 240 |
| Screw Rotation, rpm | 27 | 12.4 | 12.1 | 35.4 |
| Couple, % | 7 | 28 | 15 | 34 |
| Pressure, bar | 22 | 85 | 84 | 212 |
| Extruder 5, external | PA11Cu | PA11Cu | PA11Cu | PA11Cu |
| Z1, °C. | 170 | 190 | 200 | 190 |
| Z2, °C. | 200 | 210 | 220 | 240 |
| Z3, °C. | 220 | 220 | 240 | 240 |
| Z4, °C. | 240 | 230 | 250 | 240 |
| Z5, °C. | 240 | 240 | 250 | 240 |
| Z6, °C. | 240 | 240 | 250 | 240 |
| Z7, °C. | 240 | 240 | 250 | 240 |
| Screw Rotation, rpm | 37.3 | 38.3 | 32.8 | 32.1 |
| Couple, % | 30 | 38 | 28 | 23 |
| Pressure, bar | 74 | 287 | 98 | 108 |
| Coextrusion head | | | | |
| Temp., °C. | 240 | 260 | 260 | 250 |
| Tools | | | | |
| Z1, °C. | 240 | 260 | 260 | 250 |
| Z2, °C. | 240 | 260 | 260 | 250 |
| Z3, °C. | 230 | 260 | 260 | 250 |
| Calibration | | | | |
| Gauge diameter, mm | 9 | 8.85 | 9.5 | 9 |
| Bleed rate | 36 | 38 | 44 | |
| Gauge-die distance | 60 | 35 | 30 | 70 |
| depression, mbar | 100 | 80 | 50 | 120 |
| Line | | | | |
| Line speed, m/min | 20 | 20 | 20 | 20 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 0851380, filed Mar. 3, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A multilayer structure comprising at least two layers:
   an innermost layer, intended to be in contact with a fluid, said inner layer predominantly comprising at least one polyamide and at least one organic stabilizer, and not comprising any copper, and
   an outermost layer, intended to be in contact with air, said outer layer predominantly comprising at least one polyamide and at least one copper-based stabilizer, said copper-based stabilizer being copper halides, copper acetate, copper halides or copper acetate in admixture with at least one alkali metal halide, or mixtures thereof, or complexed coppers.

2. The structure according to claim 1, wherein the innermost layer does not comprise any transition metal.

3. The structure according to claim 1, wherein the outermost layer predominantly comprises at least one high-carbon polyamide, having a mean number of carbon atoms per nitrogen atom of at least 9.

4. The structure according to claim 3, wherein the polyamide is PA11, PA12, PA10.10, PA10.12, PA6.18, PA10.T, coPA12/10.T, coPA11/10.T, or mixtures thereof.

5. The structure according to claim 1, wherein the organic stabilizer is phenolic antioxidants, amine antioxidants, phosphate stabilizers, HALS or UV absorbers, or mixtures thereof.

6. The structure according to claim 1, further comprising at least one motor vehicle fluid-barrier layer, comprising at least one EVOH copolymer, polyamide or mixture of polyamides, the said polyamide being a low-carbon polyamide in which the mean number of carbon atoms per nitrogen atom is less than 9, and optionally comprising aromatic units.

7. The structure according to claim 1, further comprising at least one binder layer that is a mixture of copolyamides 6/12, a functionalized polyolefin or a mixture of one or more polyamides with a functionalized polyolefin.

8. The structure according to claim 1, wherein the predominant polyamide(s) present in the compositions constituting the layers has a heat of fusion of greater than or equal to 25 J/g (DSC).

9. The structure according to claim 1, wherein the predominant polyamide(s) present in the compositions constituting the layers has a melting point of greater than or equal to 170° C.

10. The structure according to claim 1, comprising
    an innermost layer, comprising at least one high-carbon polyamide having a mean number of carbon atoms per nitrogen atom of at least 9, and an organic stabilizer, and
    an outermost layer, comprising at least one high-carbon polyamide having a mean number of carbon atoms per nitrogen atom of at least 9 and a copper-based stabilizer.

11. The structure according to claim 7, comprising:
    an innermost layer, comprising at least one polyamide bearing aromatic units, and an organic stabilizer,
    an intermediate binder layer, that is a mixture of copolyamides 6/12, a functionalized polyolefin or a mixture of one or more polyamides with a functionalized polyolefin, and
    an outermost layer, comprising at least one high-carbon polyamide comprising a mean number of carbon atoms per nitrogen atom of at least 9, and a copper-based stabilizer.

12. The structure according to claim 1, in the form of a pipe, a container, a film or a plate.

13. A method for transporting or storing fluids, comprising transporting said fluids in a pipe or containing said fluids in a container, wherein said pipe or container is a multilayer structure according to claim 1.

14. A method according to claim 13, wherein the fluid is an oil, a brake fluid, urea solutions, glycol-based coolant liquids, combustibles, biocombustibles or biodiesels.

15. The structure according to claim 1, wherein the outermost layer predominantly comprises at least one high-carbon polyamide, having a mean number of carbon atoms per nitrogen atom of at least 10.

16. The structure according to claim 1, wherein the copper-based stabilizer is a mixture of copper iodide and potassium iodide.

17. The structure according to claim 1, wherein the copper-based stabilizer is cuprous chloride, cupric chloride, cuprous bromide, cuprous iodide, cupric iodide, cuprous acetate and cupric acetate, a silver halide and a copper-based stabilizer or a silver acetate and a copper-based stabilizer.

* * * * *